(12) United States Patent
Collopy et al.

(10) Patent No.: US 9,996,884 B2
(45) Date of Patent: Jun. 12, 2018

(54) VISIBLE INSURANCE

(71) Applicant: Great Lakes Incubator, LLC, Beachwood, OH (US)

(72) Inventors: Fred Collopy, Cleveland Heights, OH (US); Craig Allen Nard, Shaker Heights, OH (US); Himanshu S. Amin, Solon, OH (US); Gregory Turocy, Moreland Hills, OH (US); Patrica Sue Murphy, Brook Park, OH (US); Ronald Charles Krosky, Lakewood, OH (US); David Noonan, Webster Groves, OH (US); Gustavo Arnaldo Narvaez, Solon, OH (US); Brian Asquith, Cleveland Heights, OH (US)

(73) Assignee: Great Lakes Incubator, LLC, Beachwood, OH (US)

( * ) Notice: Subject to any disclaimer, the term of this patent is extended or adjusted under 35 U.S.C. 154(b) by 0 days. days.

(21) Appl. No.: 14/805,133

(22) Filed: Jul. 21, 2015

(65) Prior Publication Data

US 2015/0324927 A1    Nov. 12, 2015

Related U.S. Application Data

(63) Continuation of application No. 12/395,342, filed on Feb. 27, 2009, now abandoned.
(Continued)

(51) Int. Cl.
*G06Q 40/00*    (2012.01)
*G06Q 40/08*    (2012.01)

(52) U.S. Cl.
CPC ................................. *G06Q 40/08* (2013.01)

(58) Field of Classification Search
CPC ....................................................... G06Q 40/08
(Continued)

(56) References Cited

U.S. PATENT DOCUMENTS 5,548,273 A    8/1996 Nicol et al.
5,557,254 A    9/1996 Johnson et al.
(Continued)

FOREIGN PATENT DOCUMENTS

EP    0389132    10/1995
EP    1746537 A2 *    1/2007    ............. G06Q 40/02
(Continued)

OTHER PUBLICATIONS

Fox News: "Tracking Devices Let Parents Keep Watch on Teen Drivers", Jul. 30, 2007.*
(Continued)

*Primary Examiner* — Edward J Baird
(74) *Attorney, Agent, or Firm* — Amin, Turocy & Watson, LLP

(57) ABSTRACT

Real-time insurance rates can be generated and presented to a driver—as the rate changes, the change can be shown through an interface. Different factors can be evaluated and based upon a result of the evaluation, the rate can be determined. The determination can be performed locally at a vehicle as well as by an insurance company. A bidding process can be used where different insurance companies supply rates and a user or automated process selects the rate for use—the selected rate is conveyed upon the interface.

14 Claims, 10 Drawing Sheets

Related U.S. Application Data

(60) Provisional application No. 61/118,400, filed on Nov. 26, 2008.

(58) Field of Classification Search
 USPC .................................. 705/4, 35–40
 See application file for complete search history.

(56) References Cited

U.S. PATENT DOCUMENTS

| | | |
|---|---|---|
| 5,797,134 A | 8/1998 | McMillan et al. |
| 5,852,811 A | 12/1998 | Atkins |
| 5,884,274 A | 3/1999 | Walker et al. |
| 5,918,180 A | 6/1999 | Dimino et al. |
| 5,964,821 A | 10/1999 | Brunts et al. |
| 6,064,970 A | 5/2000 | McMillan et al. |
| 6,141,611 A | 10/2000 | Mackey et al. |
| 6,456,207 B1 | 9/2002 | Yen et al. |
| 6,456,982 B1 | 9/2002 | Pilipovic |
| 6,502,020 B2 | 12/2002 | Lang |
| 6,594,635 B1 | 7/2003 | Erlanger |
| 6,615,187 B1 | 9/2003 | Ashenmil et al. |
| 6,868,386 B1 | 3/2005 | Henderson et al. |
| 6,889,064 B2 | 5/2005 | Baratono et al. |
| 7,010,289 B2 | 3/2006 | Jijina et al. |
| 7,142,962 B1 | 11/2006 | Pflieger et al. |
| 7,145,442 B1 | 12/2006 | Wai |
| 7,174,171 B2 | 2/2007 | Jones et al. |
| 7,395,219 B2 | 7/2008 | Strech |
| 7,469,215 B2 | 12/2008 | Kwan |
| 7,567,914 B2 | 7/2009 | Bonissone et al. |
| 7,698,158 B1 | 4/2010 | Flagg |
| 7,734,525 B2 | 6/2010 | Zborovskiy et al. |
| 7,827,046 B2 | 11/2010 | Conner et al. |
| 7,865,378 B2 | 1/2011 | Gay |
| 7,937,278 B1 | 5/2011 | Cripe et al. |
| 8,024,112 B2 | 9/2011 | Krumm et al. |
| 8,090,598 B2 | 1/2012 | Bauer et al. |
| 8,140,358 B1 | 3/2012 | Ling et al. |
| 8,577,703 B2 * | 11/2013 | McClellan ............ G06Q 40/02 705/7.11 |
| 2002/0026334 A1 | 2/2002 | Igoe |
| 2002/0046207 A1 | 4/2002 | Chino et al. |
| 2002/0065687 A1 | 5/2002 | Onoue |
| 2002/0069157 A1 | 6/2002 | Jordan |
| 2002/0078173 A1 | 6/2002 | Horn et al. |
| 2002/0095317 A1 | 7/2002 | McCabe |
| 2002/0097193 A1 | 7/2002 | Powers |
| 2002/0116228 A1 | 8/2002 | Bauer et al. |
| 2002/0128882 A1 | 9/2002 | Nakagawa et al. |
| 2002/0152115 A1 | 10/2002 | Morita et al. |
| 2003/0033173 A1 | 2/2003 | Suzuki et al. |
| 2003/0050825 A1 | 3/2003 | Gallivan et al. |
| 2003/0058842 A1 | 3/2003 | Bud |
| 2003/0069761 A1 | 4/2003 | Nozaki et al. |
| 2003/0093304 A1 | 5/2003 | Keller et al. |
| 2003/0177140 A1 | 9/2003 | Debard et al. |
| 2003/0220835 A1 | 11/2003 | Barnes et al. |
| 2003/0224854 A1 | 12/2003 | Joao |
| 2004/0039609 A1 | 2/2004 | Burkitt |
| 2004/0122570 A1 | 6/2004 | Sonoyama et al. |
| 2004/0143378 A1 | 7/2004 | Vogelsang |
| 2004/0153362 A1 | 8/2004 | Bauer et al. |
| 2004/0160327 A1 | 8/2004 | Kusano |
| 2004/0267410 A1 | 12/2004 | Duri et al. |
| 2005/0027635 A1 | 2/2005 | Monroe et al. |
| 2005/0049765 A1 | 3/2005 | Chetia et al. |
| 2005/0065711 A1 | 3/2005 | Dahlgren et al. |
| 2005/0071202 A1 | 3/2005 | Kendrick |
| 2005/0099279 A1 | 5/2005 | Forbes et al. |
| 2005/0125148 A1 | 6/2005 | Van Buer et al. |
| 2005/0156726 A1 | 7/2005 | Rubel |
| 2005/0222730 A1 | 10/2005 | Taipale |
| 2005/0243558 A1 | 11/2005 | Van Duyn |
| 2006/0053038 A1 | 3/2006 | Warren et al. |
| 2006/0074724 A1 | 4/2006 | Schwartz et al. |
| 2006/0129313 A1 | 6/2006 | Becker et al. |
| 2006/0212195 A1 | 9/2006 | Veith et al. |
| 2006/0229940 A1 | 10/2006 | Grossman |
| 2006/0286989 A1 | 12/2006 | Illion |
| 2007/0050248 A1 | 1/2007 | Huang et al. |
| 2007/0027726 A1 | 2/2007 | Warren et al. |
| 2007/0073477 A1 | 3/2007 | Krumm |
| 2007/0112475 A1 | 5/2007 | Koebler et al. |
| 2007/0168233 A1 | 7/2007 | Hymel et al. |
| 2007/0208497 A1 | 9/2007 | Downs et al. |
| 2007/0208751 A1 | 9/2007 | Cowan |
| 2007/0216521 A1 * | 9/2007 | Guensler ............ G08G 1/0104 340/439 |
| 2007/0232354 A1 | 10/2007 | Moscovitz et al. |
| 2007/0239992 A1 | 10/2007 | White et al. |
| 2007/0243558 A1 | 10/2007 | Suovaniemi et al. |
| 2007/0257804 A1 | 11/2007 | Gunderson et al. |
| 2008/0059019 A1 | 3/2008 | Delia et al. |
| 2008/0064446 A1 | 3/2008 | Camp et al. |
| 2008/0077451 A1 * | 3/2008 | Anthony ............... G06Q 10/10 705/4 |
| 2008/0085689 A1 | 4/2008 | Zellner |
| 2008/0102894 A1 | 5/2008 | Ban et al. |
| 2008/0120175 A1 | 5/2008 | Doering |
| 2008/0122595 A1 | 5/2008 | Yamamichi et al. |
| 2008/0126138 A1 | 5/2008 | Cherney et al. |
| 2008/0147245 A1 | 6/2008 | Koepf et al. |
| 2008/0154651 A1 * | 6/2008 | Kenefick ............ G06Q 40/08 705/4 |
| 2008/0154714 A1 | 6/2008 | Liu et al. |
| 2008/0174451 A1 | 7/2008 | Harrington et al. |
| 2008/0188217 A1 | 8/2008 | Harter et al. |
| 2008/0189142 A1 | 8/2008 | Brown et al. |
| 2008/0228605 A1 | 9/2008 | Wang |
| 2008/0243558 A1 | 10/2008 | Gupte |
| 2008/0252412 A1 | 10/2008 | Larsson et al. |
| 2008/0255888 A1 * | 10/2008 | Berkobin ............ G06Q 40/08 705/4 |
| 2008/0270519 A1 | 10/2008 | Ekdahl et al. |
| 2008/0294302 A1 | 11/2008 | Basir |
| 2008/0299900 A1 | 12/2008 | Lesyna et al. |
| 2008/0319602 A1 | 12/2008 | McClellan et al. |
| 2009/0024273 A1 | 1/2009 | Follmer et al. |
| 2009/0024419 A1 | 1/2009 | McClellan et al. |
| 2009/0024420 A1 | 1/2009 | Winkler |
| 2009/0030853 A1 | 1/2009 | De La Motte |
| 2009/0037230 A1 | 2/2009 | Tracy et al. |
| 2009/0048774 A1 | 2/2009 | Yoshioka et al. |
| 2009/0063201 A1 | 3/2009 | Nowotarski et al. |
| 2009/0077229 A1 | 3/2009 | Ebbs et al. |
| 2009/0082948 A1 | 3/2009 | Hiruta et al. |
| 2009/0109037 A1 | 4/2009 | Farmer et al. |
| 2009/0112634 A1 | 4/2009 | Koziol et al. |
| 2009/0125321 A1 | 5/2009 | Charlebois et al. |
| 2009/0287499 A1 | 11/2009 | Link et al. |
| 2009/0299857 A1 | 12/2009 | Brubaker |
| 2010/0030582 A1 * | 2/2010 | Rippel ............... G06Q 10/10 705/4 |
| 2010/0057556 A1 | 3/2010 | Rousso |
| 2010/0063850 A1 | 3/2010 | Daniel et al. |
| 2010/0070171 A1 | 3/2010 | Barbeau et al. |
| 2010/0094482 A1 | 4/2010 | Schofield |
| 2010/0100485 A1 | 4/2010 | Haddy |
| 2010/0153137 A1 | 6/2010 | Rao et al. |
| 2010/0205012 A1 | 8/2010 | McClellan et al. |
| 2010/0223078 A1 | 9/2010 | Willis et al. |
| 2010/0305977 A1 | 12/2010 | Hogan et al. |
| 2011/0022417 A1 | 1/2011 | Rao |
| 2011/0106370 A1 | 5/2011 | Duddle et al. |
| 2011/0161232 A1 | 6/2011 | Brown et al. |
| 2011/0258044 A1 | 10/2011 | Kargupta |

(56) References Cited

U.S. PATENT DOCUMENTS

| | | | |
|---|---|---|---|
| 2011/0282571 | A1 | 11/2011 | Krumm et al. |
| 2011/0294520 | A1 | 12/2011 | Zhou et al. |
| 2012/0072051 | A1 | 3/2012 | Koon et al. |

FOREIGN PATENT DOCUMENTS

| | | |
|---|---|---|
| JP | 2002318844 | 10/2002 |
| WO | 2007008159 | 1/2007 |
| WO | 2007008159 A2 | 1/2007 |
| WO | 2007104982 | 9/2007 |
| WO | 2008001125 | 1/2008 |

OTHER PUBLICATIONS

Office Action for U.S. Appl. No. 14/101,208, dated Sep. 8, 2014, 24 pages.
Office Action for U.S. Appl. No. 12/490,033, dated Feb. 2, 2015, 85 pages.
Collopy, et al., "Insurance optimizer and real time analytics," U.S. Appl. No. 61/118,400, filed Nov. 26, 2008.
Office Action for U.S. Appl. No. 12/395,342, dated Jan. 29, 2015, 29 pages.
Office Action for U.S. Appl. No. 12/498,446, dated Jan. 29, 2015, 67 pages.
Office Action for U.S. Appl. No. 14/101,208, dated Mar. 17, 2015, 18 pages.
Office Action for U.S. Appl. No. 12/536,999, dated May 22, 2015, 34 pages.
Office Action for U.S. Appl. No. 12/547,800, dated Jun. 8, 2015, 60 pages.
Office Action for U.S. Appl. No. 12/624,366, dated Jun. 24, 2015, 31 pages.
Office Action for U.S. Appl. No. 13/933,043, dated Aug. 14, 2015, 65 pages.
Office Action for U.S. Appl. No. 14/101,208, dated Aug. 5, 2015, 20 pages.
Final Office Action for U.S. Appl. No. 14/101,208 dated Apr. 1, 2016, 21 pages.
Final Office Action for U.S. Appl. No. 13/933,043, dated Jun. 1, 2016, 25 pages.
Office Action dated Dec. 9, 2011 for U.S. Appl. No. 12/624,371, 34 pages.
Office Action dated Jan. 31, 2012 for U.S. Appl. No. 12/490,033, 65 pages.
Office Action dated Jan. 31, 2012 for U.S. Appl. No. 12/536,999, 25 pages.
Office Action dated Feb. 23, 2012 for U.S. Appl. No. 12/395,342, 30 pages.
Office Action dated Apr. 30, 2012 for U.S. Appl. No. 12/612,958, 32 pages.
Notice of Allowance dated May 25, 2012 for U.S. Appl. No. 12/624,371, 23 pages.
Office Action dated Mar. 19, 2012 for U.S. Appl. No. 12/498,446, 59 pages.
Office Action dated Apr. 12, 2012 for U.S. Appl. No. 12/624,366, 31 pages.
Ho, et al. "Integrating Intelligent Driver Warning Systems: Effects of Multiple Alarms and Distraction on Driver Performance". Transportation Research Board 85th Annual Meeting Compendium CD-ROM, Washington, D.C., 2006, 16 pages.
Gregory Seay, CT firm seeks to market safe-driving. Http://www.hartfordbusiness.com/news8988.html. Last accessed May 20, 2009, 1 page.
International Search Report and Written Opinion dated Mar. 19, 2010 for PCT Application Serial No. PCT/US2009/065730, 13 pages.
Office Action dated Jul. 11, 2011 for U.S. Appl. No. 12/490,033, 50 pages.

Ref. U—Ho, et al., Integrating Intelligent Driver Warning Systems: Effects of Multiple Alarms and Distraction on Driver Performances, TRB 2006 Annual Meeting, Submitted on Jul. 31, 2005 and Revised on Nov. 15, 2005 (pp. 1-16).
Office Action dated Jun. 28, 2011 for U.S. Appl. No. 12/536,999, 25 pages.
Office Action dated Jul. 22, 2011 for U.S. Appl. No. 12/395,342, 65 pages.
Office Action dated Aug. 18, 2011 for U.S. Appl. No. 12/498,446, 55 pages.
Office Action dated Oct. 13, 2011 for U.S. Appl. No. 12/547,800, 22 pages.
Office Action dated Oct. 28, 2011 for U.S. Appl. No. 12/624,366, 25 pages.
Office Action dated Nov. 10, 2011 for U.S. Appl. No. 12/612,958, 28 pages.
Office Action dated Aug. 23, 2012 for U.S. Appl. No. 12/395,342, 38 pages.
Office Action dated Nov. 8, 2012 for U.S. Appl. No. 12/624,366, 26 pages.
Office Action dated Feb. 14, 2013 for U.S. Appl. No. 12/395,342, 32 pages.
Office Action dated Feb. 15, 2013 for U.S. Appl. No. 12/547,800, 48 pages.
Chuck Rodgers, "Reporting from the Scene: Automated Crash Documentation," GPS World, Jul. 2003, pp. 34-41.
Office Action dated Apr. 11, 2013 for U.S. Appl. No. 12/624,366, 25 pages.
Office Action dated May 10, 2013 for U.S. Appl. No. 12/490,033, 62 pages.
Office Action for U.S. Appl. No. 12/624,366, dated Oct. 27, 2014, 22 pages.
Notice of Allowance dated Aug. 15, 2013 for U.S. Appl. No. 12/612,958, 33 pages.
Crichton, Katherine, "Operator safety gets a welcome lift"; Manufacturer's Monthly; May 2007.
Baxter, James J.; Most U.S. Speed restrictions are recklessly low: [Final/Sports final/All Edition]; The Plain Dealer; Jul. 24, 1993.
Office Action dated Sep. 27, 2013 for U.S. Appl. No. 12/395,342, 39 pages.
Office Action dated Aug. 14, 2013 for U.S. Appl. No. 12/547,800, 40 pages.
Non-Final Office Action dated Sep. 12, 2013 for U.S. Appl. No. 12/624,366, 35 pages.
Office Action dated Sep. 13, 2013 for U.S. Appl. No. 12/490,033, 62 pages.
Office Action dated Jan. 31, 2014 for U.S. Appl. No. 12/490,033, 186 pages.
Office Action dated Nov. 8, 2013 for U.S. Appl. No. 12/498,446, 74 pages.
OA dated Nov. 2, 2012 for U.S. Appl. No. 13/529,866, 34 pages.
Notice of Allowance dated Mar. 7, 2013 for U.S. Appl. No. 13/529,866, 19 pages.
Office Action dated Mar. 25, 2014 for U.S. Appl. No. 12/395,342, 67 pages.
Office Action dated Feb. 10, 2014 for U.S. Appl. No. 12/547,800, 48 pages.
Willassen, Svein. Forensics and the GSM mobile telephone system. International Journal of Digital Evidence. Spring 2003. vol. 22 Issue 1.
OA dated Mar. 27, 2014 for U.S. Appl. No. 12/498,446, 78 pages.
Office Action dated Apr. 11, 2014 for U.S. Appl. No. 14/101,208, 31 pages.
Final Office Action dated Jun. 4, 2014 for U.S. Appl. No. 12/490,033, 127 pages.
Notice of Allowance dated May 27, 2014 for U.S. Appl. No. 12/624,366, 36 pages.
Office Action dated Aug. 14, 2014 for U.S. Appl. No. 12/498,446, 77 pages.
Office Action for U.S. Appl. No. 12/536,999, dated Oct. 1, 2014, 72 pages.
Office Action for U.S. Appl. No. 12/395,342, dated Sep. 9, 2014, 36 pages.

(56) References Cited

OTHER PUBLICATIONS

Office Action for U.S. Appl. No. 12/547,800, dated Nov. 24, 2014, 62 pages.
Office Action for U.S. Appl. No. 14/805,164, dated Dec. 14, 2016, 73 pages.
Office Action for U.S. Appl. No. 13/933,043 dated Jun. 1, 2017, 34 pages.
Final Office Action for U.S. Appl. No. 14/805,164, dated Aug. 11, 2017, 58 pages.

* cited by examiner

VISIBLE INSURANCE

CROSS-REFERENCE TO RELATED APPLICATIONS

This application is a continuation of U.S. patent application Ser. No. 12/395,342, filed Feb. 27, 2009, and entitled "VISIBLE INSURANCE," which claims priority to U.S. Provisional Application Ser. No. 61/118,400, filed Nov. 26, 2008, and entitled "INSURANCE OPTIMIZER AND REAL TIME ANALYTICS." The entireties of each are incorporated herein by reference.

TECHNICAL FIELD

The subject specification relates generally to insurance rates and in particular to disclosing real-time insurance rates to a vehicle operator.

BACKGROUND

Insurance coverage is a commodity that many people purchase for peace of mind and/or because local laws require such coverage. Thus, most people might consider insurance as something that is necessary and, at times, undesirable due to high cost of insurance premiums. A person can pay an insurance premium at one instance for coverage over a block of time, such as making a payment semi-annually for six months of coverage. Once the premium is paid, the driver commonly does not think about insurance until the next payment is due or an incident occurs that brings the premium to the driver's consciousness (e.g., being in an automobile accident). With limited and infrequent thought to insurance premiums, drivers can be less likely to perform actions that are beneficial to lowering their premiums as well as their risk factor.

Insurance companies calculate premiums for coverage through complex models based upon a variety of factors. The goal of these models is to determine a risk level associated with a driver or vehicle—based upon the risk level, an amount for the premium can be ascertained. Age, driver citation history, and other factors can be used in determining the risk level and thus ascertaining the amount for a premium.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

With the disclosed innovation, insurance rates can be calculated in real-time and be presented to a driver through an interface in their vehicle. Multiple benefits can be gained based upon real-time calculation and presentation, such as making a driver more aware of how his actions influence his risk and therefore his insurance premium. Real-time calculations can model actual driving and thus provide more accurate rates that can benefit both the driver and an insurance provider.

Additionally, the real-time calculations can be presented to the driver through an interface and thus insurance can be brought to a driver's consciousness. As the driver changes speed, travels along different road types, geographic areas, and the like, the insurance rate can dynamically change and the change can be presented through the interface. In addition to presenting the rate (or a representation of the rate), the driver can be presented with a suggestion on how to modify behavior in order to bring the insurance rate down. In an illustrative instance, the driver can be instructed that driving more slowly can lower her insurance rate and be presented indication of the saving achieved by altering conduct.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
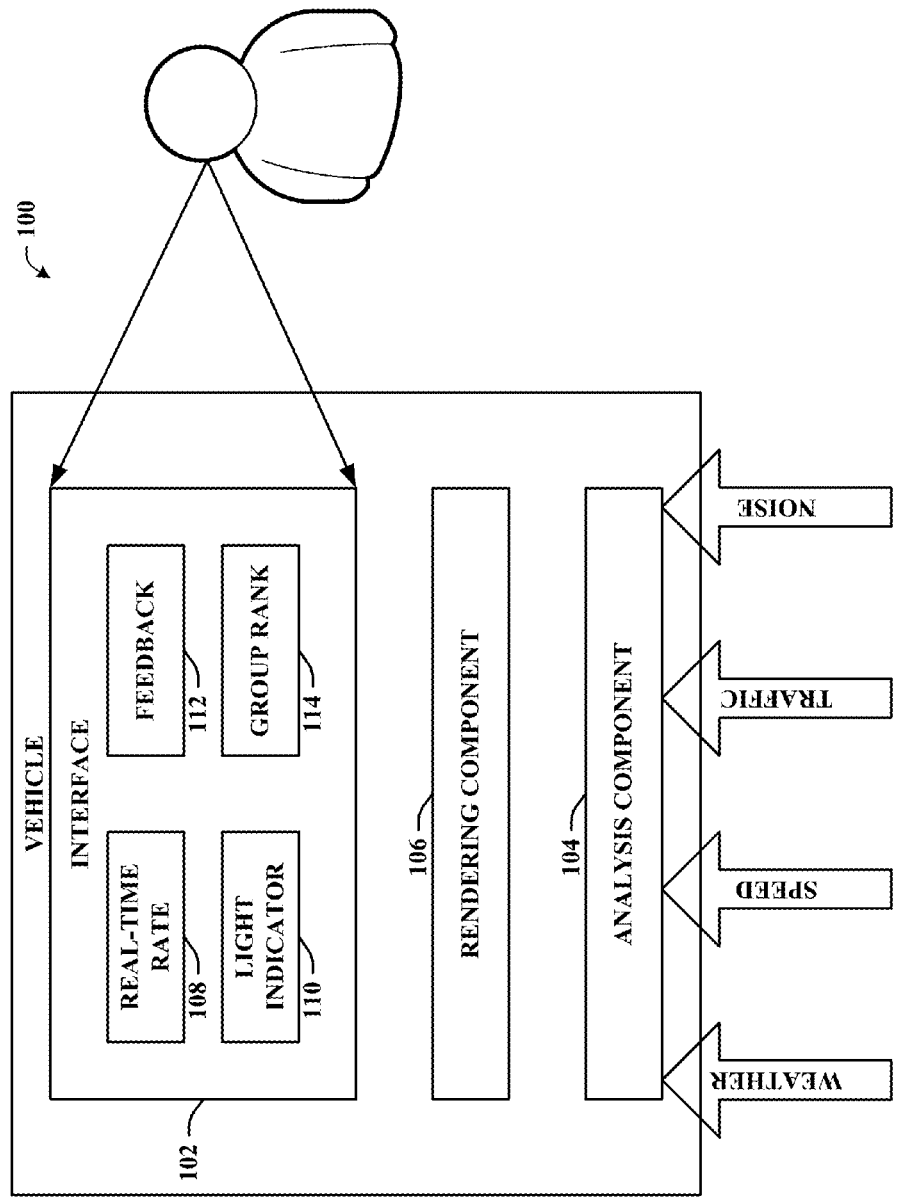
FIG. 1 illustrates a representative configuration for producing and disclosing real-time insurance information in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Because insurance is purchased and then forgotten, the selling company has difficulty achieving many of the benefits of a brand. For example, rarely does a guest in one's car comment "Oh, I see you have xyz insurance. How do you like dealing with them?"

FIG. 1 shows an example configuration 100 for disclosing an interface 102 to the user with real-time insurance information. Insurance can be calculated in real-time and as such can more accurately reflect appropriate coverage for a situation of a driver. A plurality of different factors can influence a likelihood of the driver being involved in an accident, having a vehicle stolen, and the like. For example, if the driver is travelling through bad weather, then risk can be higher and a rate can be increased in real-time as weather conditions change—conversely, if there is relatively little traffic surrounding the driver's vehicle, then the rate can be lowered. An algorithm or complex model can be used to calculate the insurance and the insurance rate can be disclosed to the user through the interface 102.

To facilitate operation, an analysis component 104 can be employed that evaluates insurance rate information against current vehicle operation by a user. Specifically, the evaluation can compare the current operation against insurance rate information ( ) to determine if an appropriate rate is being used, if the rate should be changed, what the change should be, etc. For instance, different aspects of vehicle operation can be taken into account—FIG. 1 discloses four aspects of metadata that relate to insurance rate: weather and how a user reacts, speed (of a vehicle), traffic and how the user reacts, and noise (e.g., radio level). It is to be appreciated that numerous other aspects can be taken into consideration.

A rendering component 106 can be employed that renders on a display a real-time insurance rate that is based at least in part on a result of the evaluation. For example, an insurance rate can be determined and represented upon the interface 102—as more information is gathered, pieces of driver information change, and the like, the interface 102 can be manipulated to disclose a changed rate. A processor that executes the computer executable components stored on a storage medium can be employed (e.g., analysis component 104 and rendering component 106).

In an alternative embodiment, the analysis component 104 can communicate with an insurance company (e.g., continuous communication) and obtain an insurance rate directly. The rendering component 106 can modify the interface 102 such that the obtained rate is presented to the user. As new rates are identified by the analysis component 104, the rendering component 106 can make appropriate modification to the interface automatically.

The interface 102 can configure such that different pieces of information are presented to a user. For example, a real-time rate portion 108 can be presented and modified depending on an output of the rendering component 106. The rate shown can be monthly, hourly, a rate of a journey (e.g., travel from two different points), and others. Data associated with the rate can also be disclosed, such as which company is supplying the rate.

A light indicator 110 can be used by the interface to quickly highlight to an operator how her driving influences the insurance rate. With one implementation, the user can be protected through coverage associated with a standard rate (e.g., X dollars per month) that is generally applied. However, if a user drives in a certain manner or meets a certain standard, then the rate can be modified in a positive or negative direction. For example, if a user obeys the speed limit for Y % of the time she drives in a month, then she can receive a Z % discount on her rate. This can also be used to increase the rate, such that obeying the speed limit for less than a prescribed amount causes a rate to increase. A light indicator 110 can change color based upon vehicle operate in relation to a real-time insurance rate. For instance, a red-yellow-green indicator can be used where if a driver is performing to lower her rate then green is shown, to increase her rate then red is shown, and if there is no change, then yellow is shown. In one implementation, the light indicator 110 can integrate in a heads-up display so the driver can quickly ascertain if they are driving in a beneficial or detrimental manner.

More detailed feedback can be provided to the user and displayed through portion 112 of the interface. For example, a reason why the light indicator 110 is red can be provided—analysis of travel can be performed and the feedback can be limited in disclosure during safe instances (e.g., a vehicle is stopped at a traffic signal, the vehicle is in park, etc.). It is also possible for a user to be involved in a travel group, such that rates and/or discounts (e.g., coupons, rate reduction, etc.) are based upon how the drive compares against other group members. For example, a number of parents whose children play on a sports team can join in a travel group, such that a safest member is provided a discount insurance rate (e.g., since there is a high likelihood one parent travels with children from different families). A group rank (e.g., ranking of safety of a user within a peer group) can be presented through portion 114 and as such, a driver can determine if he should modify driving behavior—data of the travel group can be disclosed to other members. In an illustrative instance, parents of new drivers can enroll their newly driving children in a ranking program. With this ranking program, a child can be ranked against his peers (e.g., nationally, from a same town or school, etc.) and the ranking can be used to improve driving or incentives the child, such as through a financial reward.

Figure 2:
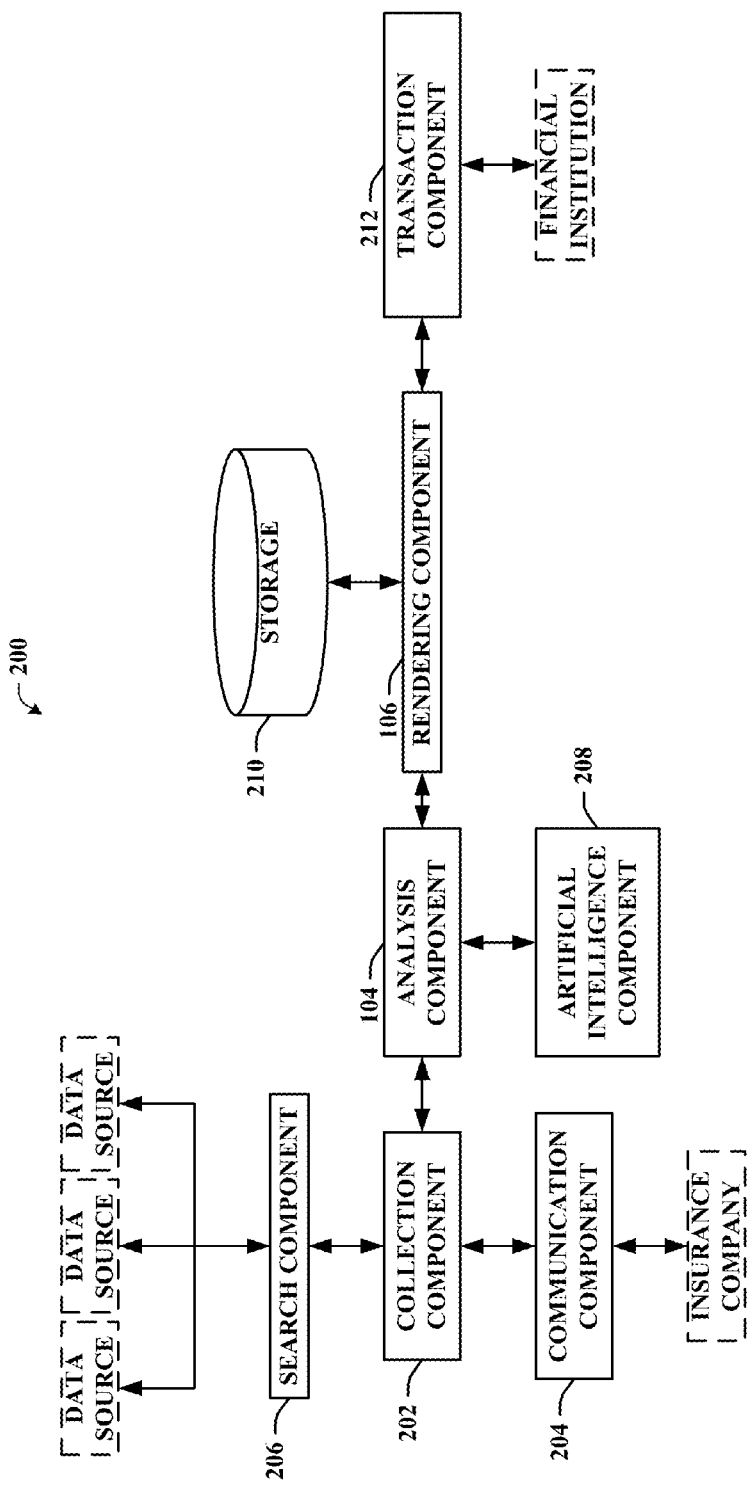
FIG. 2 illustrates a representative system for collecting information and determining an insurance rate based upon the collected information in accordance with an aspect of the subject specification.

Now referring to FIG. 2, an example system 200 is shown with various components that assist with interface modification. A collection component 202 can obtain the insurance rate information (e.g., a default insurance rate, an insurance rate model, etc.) or metadata that pertains to current vehicle operation by the user (e.g., a result of sensor monitoring). A communication component 204 and/or a search component 206 can be employed to assist in operation of the collection component 202.

The communication component 204 can engage with other devices to transfer information, such as to send a request for information, receiving information, etc. Operation can take place wirelessly, in a hard-wired manner, employment of security technology (e.g., encryption), etc.

Moreover, the communication component 204 can utilize various protective features, such as performing a virus scan on obtained data and blocking information that is positive for a virus. In one example, the communication component 204 can communicate with an insurance company to ascertain a rate.

To gather information a search component 206 can be employed to locate a source that provides information obtainable by the collection component 202. A source can be a database server, an airway transmission, an incoming electronic message, etc. Multiple sources can provide conflicting information (e.g., different radio stations provide different weather reports) and the search component 206 can include logic that resolves conflict issues (e.g., information is downloaded from a source with a history of being highly trustworthy.) For example, the analysis component 104 can initiate a request to obtain metadata. The search component 206 can determine data sources where valuable information resides and locate the data sources—the communication component 204 can make transfer requests to the data sources and response to the requests can be collected and then processed by an analysis component 104. A more active gathering can occur, such that access is requested or taken and the collection component 202 scans or extracts appropriate information.

It is to be appreciated that determinations and inferences disclosed herein can be practiced through implementation of artificial intelligence techniques. An artificial intelligence component 208 (e.g., used in practicing the artificial intelligence techniques) can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 208 can also include methods for capture of logical relationships such as theorem provers or more heuristic rule-based expert systems. The artificial intelligence component 208 can be represented as an externally pluggable component, in some cases designed by a disparate (third) party.

The rendering component 106 can determine the modification based upon logic retained on storage. Different pieces of information, such as obtained information, component operating instructions (e.g., of the search component 206), an original route, etc. can be held on storage 210. Storage 210 can arrange in a number of different configurations, including as random access memory, battery-backed memory, hard disk, magnetic tape, etc. Various features can be implemented upon storage 210, such as compression and automatic back up (e.g., use of a Redundant Array of Independent Drives configuration). The analysis component 104 and/or rendering component 106 (as well as other components) can reside at a remote location (e.g., a server at an office of the company) and transfer (e.g., through the communication component 204) an instruction used in rendering. Additionally, the analysis component 104 and/or rendering component (as well as other components) can reside upon a vehicle, personal electronic device (e.g., mobile telephone), at a third party location, be distributed across a data network, etc.

Additionally, a transaction component 212 can be employed to perform financial reward functions and operations. For instance, if a driver meets a standard (e.g., travel for a journey without speeding), then the driver can be rewarded with a financial credit. The transaction component 212 can instruct a financial institution (e.g., through the communication component 204) to credit an account for the driver, send the driver a check, etc.

Figure 3:
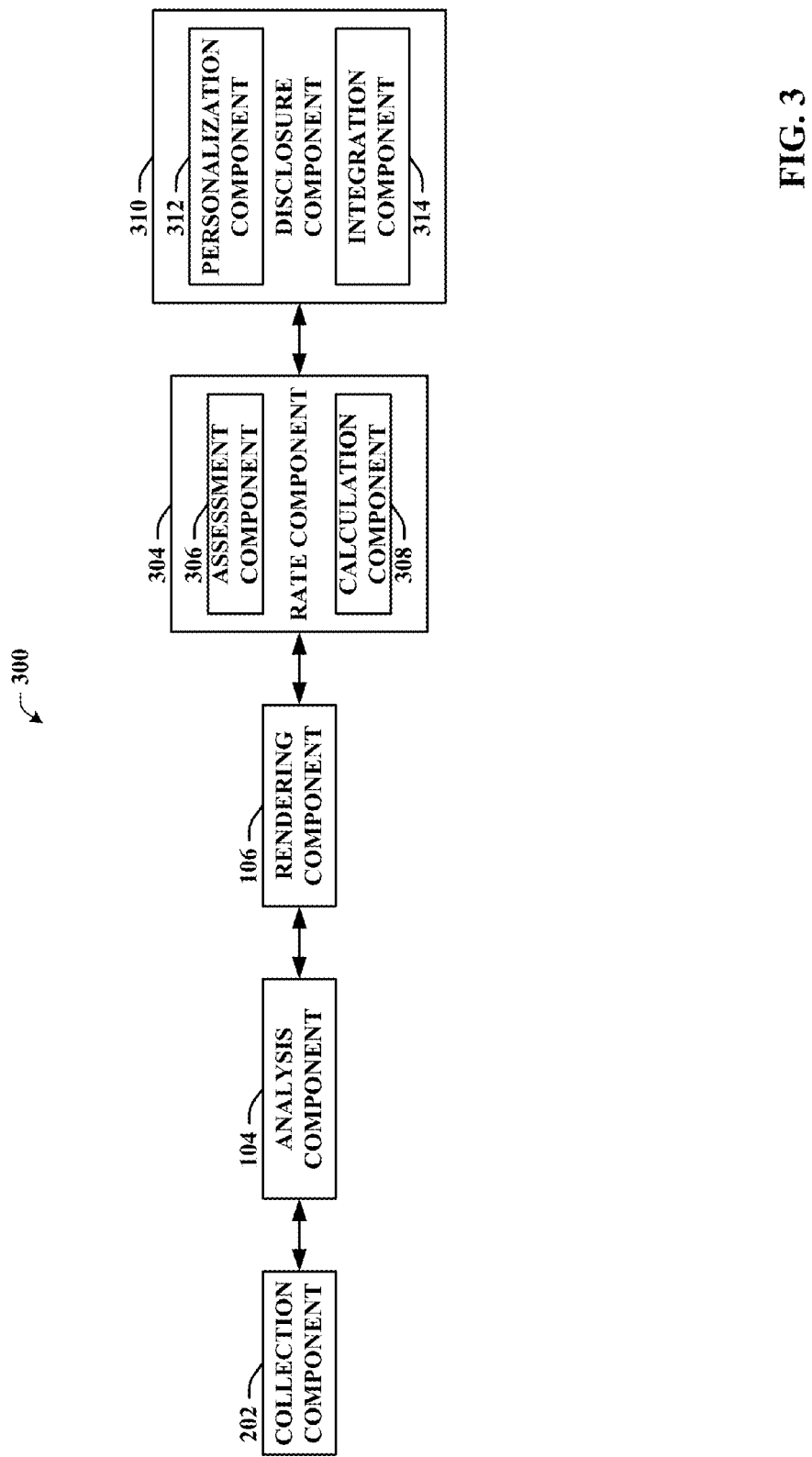
FIG. 3 illustrates a representative system for performing functions in relation to determining and presenting real-time insurance information in accordance with an aspect of the subject specification.

Now referring to FIG. 3, an example system 300 is disclosed for performing operations in relation to presentation of a real-time insurance rate. A collection component 202 can gather information, an analysis component 104 evaluate at least a portion of the collected information, and the rendering component 106 can determine how to manipulate an interface based upon the evaluation. According to one embodiment, the collection component 202 can obtain information from local sources (e.g., a speed sensor, an internal cabin microphone, etc.), remote sources (e.g., weather stations), dedicated sources (e.g., a database of driver history), and the like. The analysis component 104 can be employed that evaluates at least a portion of the obtained metadata (e.g., a result of the evaluation is used by the rendering component to render the real-time insurance rates on the display). The evaluation can include statistical comparison, inputting of metadata into a model, predictive analysis, etc. Moreover, the manipulation can include changing a number upon the interface, changing a color of an interface element, turning the interface on or off, etc. Additionally, a rate component 304 can be used to determine a real-time insurance rate (e.g., make the determination based on a result of the analysis).

An assessment component 306 can be used that appraises real-time vehicle operation (e.g., if a vehicle is speeding, rapid acceleration, frequent braking) or at least one contextual factor related to current vehicle operation. The assessment component 306 can function as part of a cellular telephone, radio frequency identifier, keyfob, or a combination thereof, as well as others. The at least one contextual factor can include traffic level (e.g., heavy traffic, light traffic, speed of surrounding traffic, driver history of surrounding traffic, etc.). Depending on if there is heavy traffic, risk can change and thus influence the rate. The factor can also include a number of passengers in the vehicle (e.g., identity of passengers, if there are passengers, characteristics of the passengers, etc.). Different risk factors can be associated with children in comparison to adults and be used in rate calculation. Another factor can include a status of an operator related to engagement of a cellular telephone communication—if a user is on a cellular call, then a rate can be increased. A further factor includes time of day, such that if driving occurs at night visibility can be lowered and a different rate applied. Yet another factor includes weather—this can include pure weather (e.g., rainy roads, snow that limits visibility, a clear day) as well as how an operator reacts to a weather condition (e.g., historically, if a user is slowing to compensate for low traction, etc.). A further factor can be history of a neighborhood that the vehicle travels through; this can relate to operation as well as to real-time insurance for vandalism, theft, etc. If the user parks a car overnight in a high crime area with high history of car thefts, then a rate can be increased. Another contextual factor considered can be intended destination of the operator and context surrounding the destination. For example, if a user is a student that is headed to a class and she is late, then there is a higher likelihood of her driving recklessly and thus the rate can be increased. Yet another factor can include real-time condition of the vehicle. In one example, if tire pressure is low, then there can be an inference that there is a higher likelihood of an accident and thus a rate should be increased. A combination of these factors as well as other factors can be used. The assessment component 306 can also be used to weigh different factors against one another to determine if an operator is overall being safe or unsafe. A calculation component 308 can be used that determines the insurance rate that is rendered based upon an outcome of the appraisal and the evaluation.

A disclosure component 310 can provide a real-time insurance rate to a user (e.g., operating a vehicle passenger or operator, as a pedestrian, etc.), such as through display (e.g., an interactive interface)—thus, the disclosure component 310 can produce the display. A non-exhaustive list of disclosure components include a display screen, touch screen, speaker system, virtual reality environment, Braille production system, printer, etc. In addition, the disclosure component 310 can present information (e.g., through the display) in multiple formats, such as showing a video with audio capabilities. Moreover, the disclosure component 310, as well as other components disclosed in the subject specification can implement upon a personal electronic device (e.g., cellular telephone, personal digital assistant, etc.), upon a vehicle (e.g., automobile, motorcycle, bicycle, airplane, helicopter, motorboat, self-balancing transportation device, etc.), etc.

The disclosure component 310 can include a personalization component 312 and/or an integration component 314—however, it is to be appreciated that the personalization component 312 and/or integration component 314 can function as independent entities (e.g., not implement upon the disclosure component 310). The personalization component 312 can be used to enable a user to modify the display (e.g., interface). The modification can include information displayed upon the interface (e.g., which items are disclosed, such as rate, target speed, etc.), location of information displayed upon the interface (e.g., formatting what is shown where), where the interface displays (e.g., on a dashboard, in a heads-up display, integrated as part of a navigation system, etc.), or a combination thereof, as well as others, such as color or theme of the interface.

The disclosure component 310 can produce the display with driving feedback information (e.g., real-time feedback, a collective summary of a journey of how a user can improve vehicle operation to lower an insurance rate, etc.). The produced display can also include an indicator showing at least one standard that is used to achieve an insurance rate modification (e.g., a target speed the driver should keep under). Another rendering can include a status of at least one standard that is used to achieve an insurance rate modification (e.g., if the user has exceeded the standard). A combination of these as well as other factors can be used.

Figure 4:
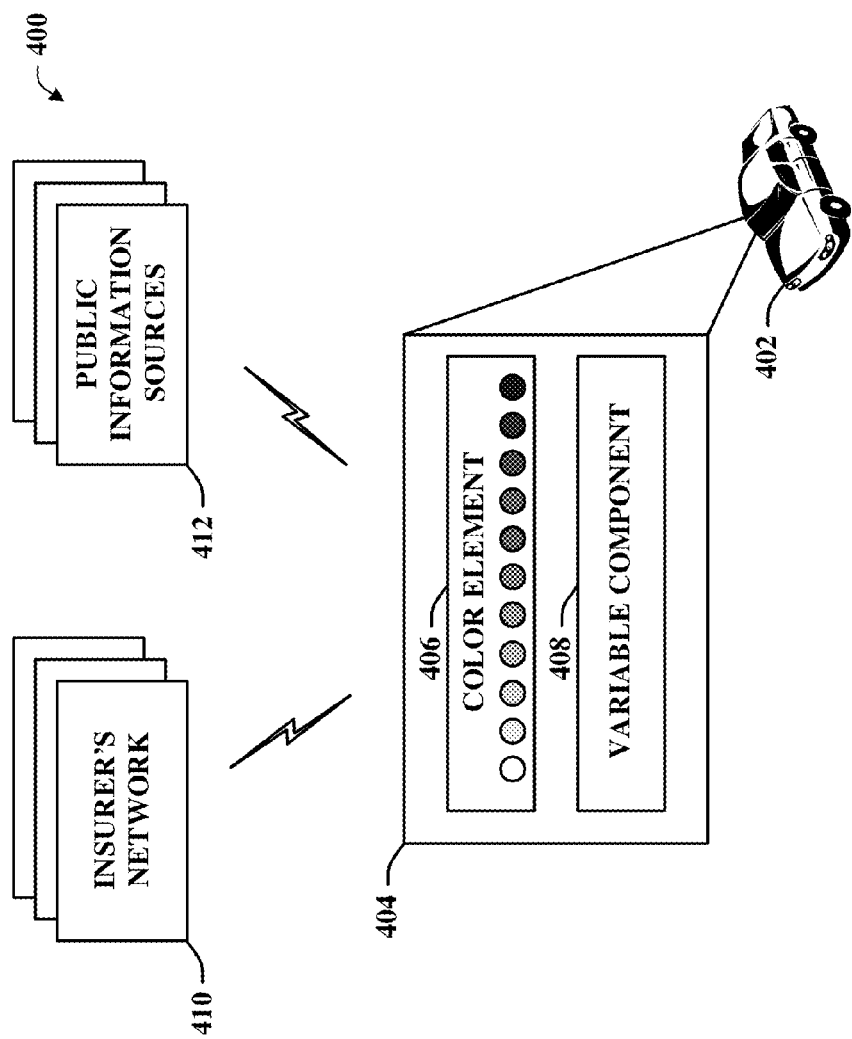
FIG. 4 illustrates a representative system for insurance information disclosure through use of a color element in accordance with an aspect of the subject specification.

Now referring to FIG. 4, an example system 400 is shown for presenting insurance information to an operator. A vehicle 402 can include a device 404 that displays information in relation to insurance associated with the vehicle 402. Depending on a real-time rate used, the display can change indicating to an operator how current conditions influence the rate. The device 402 can include a color element 404 that varies in color across a spectrum. Moreover, the device 402 can include a variable component 406 that displays at least one color across the spectrum to indicate a current driving condition. The device 404 can be located in a driver's viewing range during operation of the vehicle 402. The device 404 can also prominently display a name of the insuring company providing coverage to make the feature of variable rate insurance visible to the driver and passengers in the vehicle.

According to one embodiment, the current driving condition is a function of a safe operation or an unsafe operation of the vehicle (e.g., travelling speed, distance from other vehicles, etc.). A safe operation can be indicated at the first end of the spectrum and the unsafe operation can be indicated at the second end of the spectrum. Moreover, the safe operation or the unsafe operation of the vehicle can be determined based on vehicle telemetrics of the vehicle 402 (e.g., if drivers are wearing safety belts, if a radio is playing, if an oil change is due, etc.), an insurer's network 410 (e.g., driver history, overall company liability, liability against premiums, etc.), public information sources 412 (e.g., weather channels, police public communications, etc.), or combinations thereof, as well as others. The device 404 can be located within a dashboard of the vehicle 402, as well as on a personal electronic device, another part of the vehicle, etc.

There can be a device 404 that is placed on (or integral to) a vehicle's dashboard (or other location in a vehicle 402) without posing a significant risk of distraction. For example, the driver could be able to perceive the device while driving and without having to take an undue amount of concentration off the road and/or the driving environment (e.g., other drivers, pedestrians, and so forth). The device can include color elements, such as Light Emitting Diodes (LED) or other light producing means, that can vary in color across a spectrum (e.g., from red to green, from a dark shade of color to a lighter shade of color, and so forth) to indicate how safely a vehicle is being driven. The device 404 can convey to the driver the safe (or unsafe) operating condition of the vehicle 402 in real-time, which can influence the driver's behavior (e.g., cause the driver to slow down if the driver is speeding). The details related to how safely the vehicle is being driven can be based upon data from the vehicle's telemetrics (e.g., speed of the vehicle, braking characteristics, and so forth), the insurer's network 410, and/or public information sources 412 (e.g., weather conditions, construction areas, current accidents or road congestion, and so forth).

According to some aspects, a color from a different spectrum can be utilized to indicate situations when there is no information available, not enough available information, and/or no connectivity to a central network (e.g., insurer's network). For example, while a vehicle is being driven through rural areas, there might be limited or no wireless reception, thus communication cannot be conducted with another entity (e.g., insurer's network). In this situation, a different color, such as blue, can be presented to the user to indicate that information is still being gathered and/or analyzed, but there is no information available for the driver at the current time. In accordance with some aspects, the color spectrum can indicate other parameters in addition to (or in lieu of) how safely the vehicle is being driven. For example, the colors can represent operating cost, environmental impact, and/or other factors that might be of interest to the driver.

The device 404 can include a color element (with LEDs or other technology) that varies from red to green across the hue spectrum that represents how safely a vehicle is being driven based upon data from the vehicle's telemetrics, an insurer's network, and public information sources and that can be placed on the vehicle's dashboard without significant risk of distraction. The device can be relocated to become an element of the vehicle's dashboard or control display systems. In addition to a continuous red to green scale a blue element can be included in the display to indicate when there is no information available about factor of interest (e.g., safety, operating cost, environmental impact, etc.). As opposed to using a hue, relative brightness can also be used by the color element.

Figure 5:
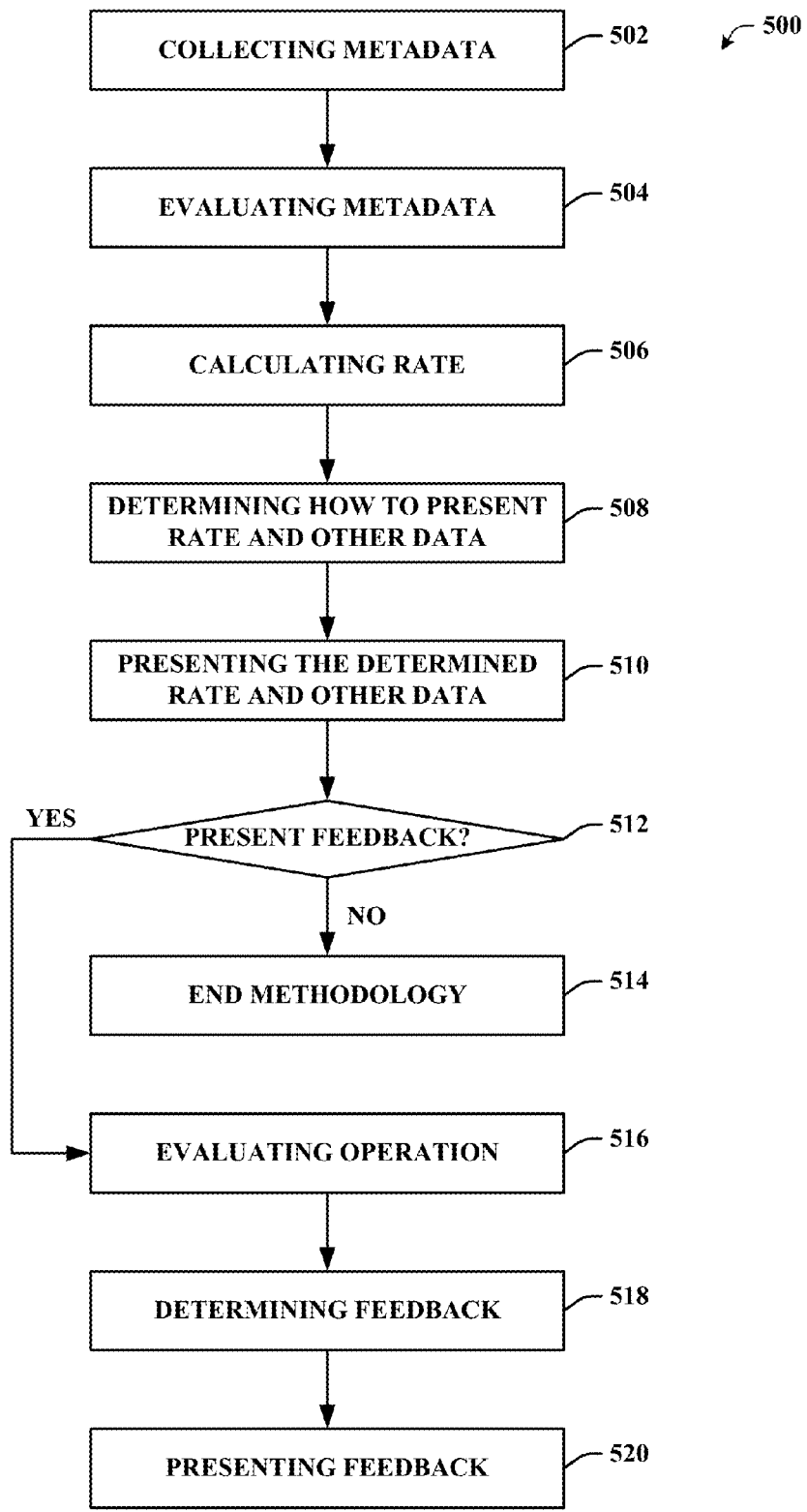
FIG. 5 illustrates a representative methodology for presenting a real-time insurance rate and supplying feedback related to the rate in accordance with an aspect of the subject specification.

Now referring to FIG. 5, an example methodology 500 is shown for presenting information related to a real-time insurance rate. Metadata can be collected at action 502 pertaining to real-time operation of a vehicle and at least a portion of the metadata can be evaluated at act 504. The metadata can include contextual information, driver history, and real-time driving information that relates to operation of a vehicle, as well as other metadata. Based upon a result of the evaluation, there can be calculation a real-time insurance rate at event 506.

A determination can be made at event 508 on how to present the calculated rate. For example, the determination can be if the rate should be shown on a center console or a heads-up display. A determination can also be made on how to display data (e.g., if a numerical rate should be disclosed or a color element should be lit). Additionally, a determination can be made on other data to disclose, such as safety, environment impact, cost of operating vehicle, a target speed, group rank, and the like. The determined rate and other determined data can be presented through a display at act 510. Thus, the determined rate is presented upon a display viewable to an operator or passenger of a vehicle.

A check 512 can determine if feedback should be presented to the user—the feedback can be supplied in real-time as well as be a collective summary presented after a driving session is complete. If no feedback should be presented, then the methodology 500 can end at act 514. In one instance, if there is a new driver attempting to obtain a full drivers license (e.g., teenage driver) or newer driver, then the check 512 can determine feedback should be automatically provided. In another embodiment, an operator can be solicited on if feedback should be presented—depending on a response the methodology 500 can end or continue.

Operation of the vehicle can be evaluated at act 516, which can occur though different embodiments. As a user operates a vehicle, metadata can be collected and evaluated in real-time. In an alternative embodiment, data can be collected, but evaluation does not occur until the check 512 determines feedback should be presented. At action 518, there can be determining feedback for suggesting future driving actions for the operator to perform in future driving to lower the insurance rate. The methodology 500 can include presenting the feedback (e.g., through the display, through a printout, transferring feedback as part of e-mail or a text message, etc.) at action 520. The feedback can be directly related to a driving session as well as be an aggregate analysis of overall driving performance (e.g., over multiple driving sessions).

Figure 6:
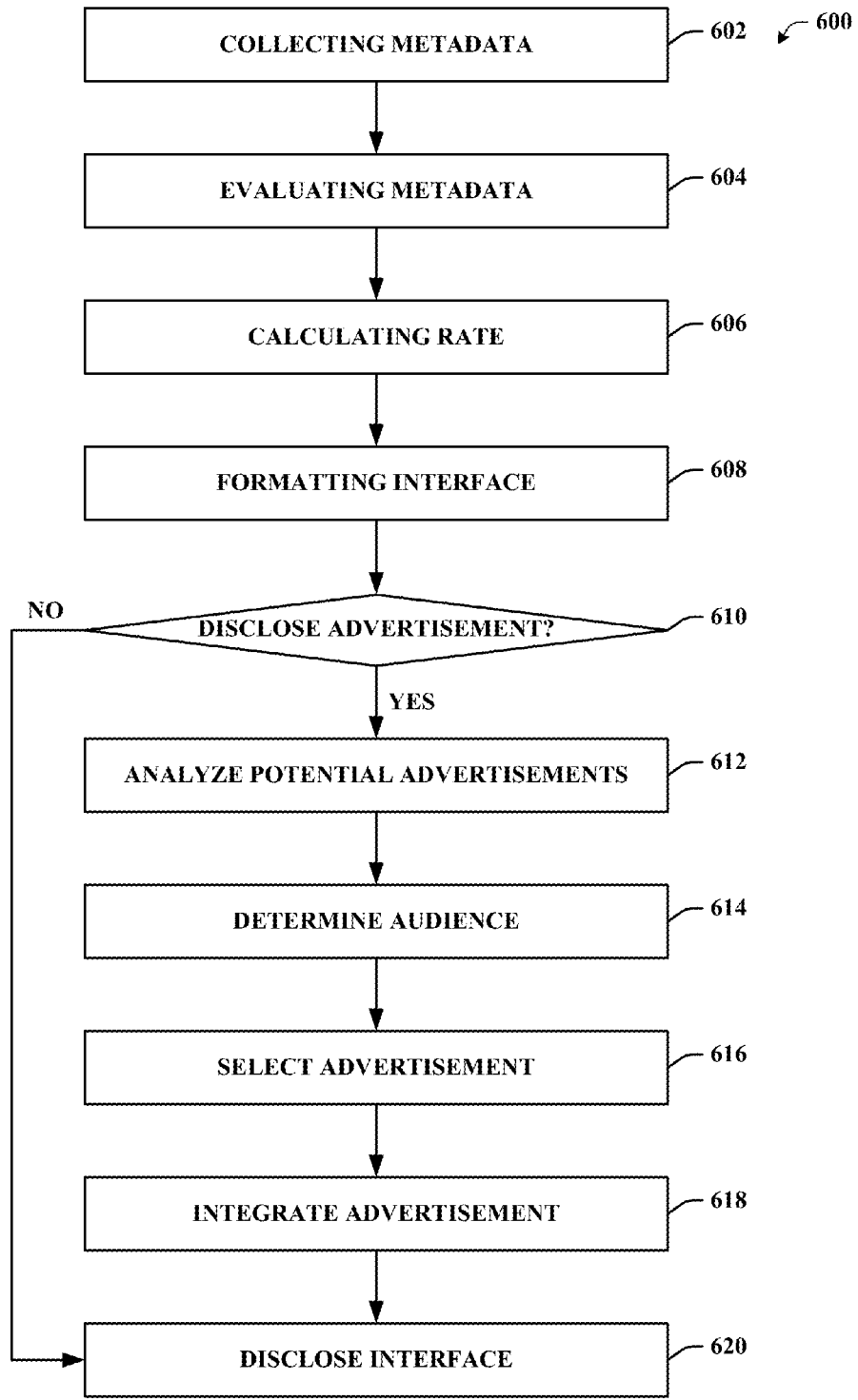
FIG. 6 illustrates a representative methodology for producing an advertisement in conjunction with a real-time insurance rate in accordance with an aspect of the subject specification.

Now referring to FIG. 6, an example methodology 600 is shown for providing an advertisement in conjunction with real-time insurance metadata. Metadata related to calculating a real-time insurance rate can be collected at event 602. At action 604, there can be evaluating contextual information, driver history, and real-time driving information that relates to operation of the vehicle. Calculating a real-time insurance rate based upon a result of the evaluation can occur though action 606 (e.g., the determined rate is presented upon a display viewable to an operator or passenger of a vehicle).

An interface can ultimately be used to disclose a calculated rate to an operator and at event 608 there can be formatting of the interface. The formatting can include color scheme, font used, brightness, where items should be shown, which items should be shown, etc. Additionally, an advertisement (e.g., paid announcement, commercial message encouraging a user to make a purchase, etc.) can be disclosed to a user. The advertisement can include a coupon, a trademark (e.g., logo of a providing insurance company), a song and/or audio message, and others.

A check 610 can occur to determine if an advertisement should be disclosed with the interface (e.g., as part of the interface). Factors that can be used in determining if the advertisement should be disclosed can include likelihood of effectiveness, amount of overall advertisement exposure, meeting of contract requirements, etc. Potential advertisements can be identified and there can be analysis of those advertisements at act 612. The analysis can include comparing an audience (e.g., operator and passengers in the vehicle) against advertisements designed to influence the audience. Therefore, an audience for the advertisement can be determined at action 614. In an alternative implementation, the analysis of act 612 and determination of action 614 are used to determine if an advertisement should be disclosed (e.g., check 610). At event 616, there can be selecting an advertisement to disclose along with the determined rate and the advertisement can be integrated upon the interface at act 618.

If the check 610 determines an advertisement should not be disclosed or if the advertisement is integrated, then the interface can be disclosed at action 620 and as such the selected advertisement can be presented with the determined rate. According to one embodiment, the display of the vehicle is physically integrated upon a dashboard of the vehicle, is a heads-up display, is located within the vehicle, or a combination thereof, as well as other. In a further embodiment, the display can be an interactive interface, upon which an operator can engage the interface and be presented information on rationale for the rate (e.g., an algorithm, factors used, etc.), how the operator can improve the rate, how the operator compares against other operators, or a combination thereof, or other information.

A regression-based method (e.g., an embodiment of methodology 600) can be used for reducing complex multidimensional data available through the insurer's network to a single or small number of values that can be represented as color(s) produced by LEDs and representing how safely the vehicle is being driven that can be placed on a vehicle's dashboard without significant risk of distraction. The method can be flexible as to a color's meaning so that in addition to representing safety, can be made to represent operating cost, environmental impact, or other factors of interest to the vehicle's driver. Also, the method can mathematical alternatives to regression-based approaches to improve the accuracy of assessments. Additionally, the method can use using a variable defined by the vehicle's driver to combine factors that are considered important (such as weighing safety, cost and environmental impact, for example or indicating how much like their normal driving pattern they are currently driving). Statistical information about the surrounding area can also be used to indicate how safe it is to leave the vehicle unattended in its current location (parking the vehicle).

Figure 7:
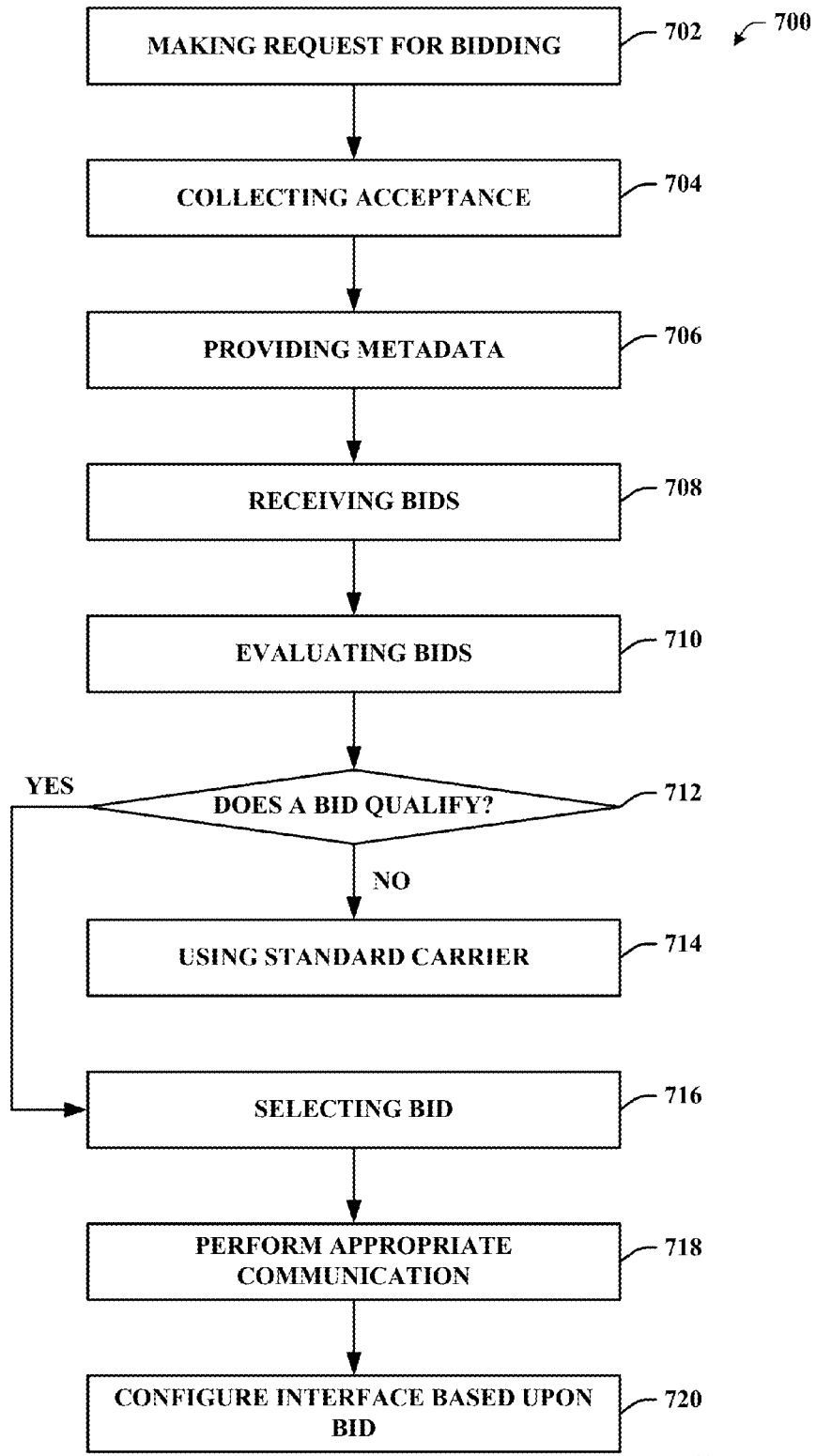
FIG. 7 illustrates a representative methodology for selecting a real-time insurance bid in accordance with an aspect of the subject specification.

Now referring to FIG. 7, an example methodology 700 is shown for selecting an insurance carrier. Different configurations can be used to provide insurance coverage in real time. For example, a journey can be evaluated (e.g., through an entered intended destination of a navigation system) and different parts of the journey can be covered by different companies (e.g., highways covered by company A, city roads by company B). Conversely, one company can cover an entire journey or span of time as well as companies continuously changed based upon different factors (e.g., if the person speeds, company X is cheaper and the switch automatically occurs). Additionally, a user can be requested to affirm a change in insurance company (e.g., explicitly, approve of the process before a journey, etc.)

Since there can be different insurance companies offering coverage, then an auction configuration can be used for company selection. A request for a bids can take place at action 702, such as at a start of a time period, a start of a journey (e.g., before starting, upon starting, and the like). Different insurance companies can determine if they want to submit bids and transfer acceptance to the request—the acceptance can be collected at act 704. Metadata can be provided to accepting companies (e.g., transferred to the companies, made accessible to the companies, etc.) at event 706. Since the metadata can be personal and sensitive in nature, access can be limited in disclosure (e.g., limited to accepting companies).

Companies can evaluate the metadata provided as well as information from other sources and determine a rate or a rate model (e.g., based on factors, such as speeding, different rates for coverage). The bids can be received at action 708 and evaluated at event 710—a bid can include one coverage option as well as different options that can be selected (e.g., $M coverage or $K coverage). In an alternative configuration, metadata disclosure is not restricted and the bidding can be a more open competition.

A check 712 can be run to determine if there is a qualifying bid. A configuration can be such that an operator or vehicle has a default insurance carrier and the bidding is used to determine if there is a company and/or bid that is better than the default. Thus, if there is no qualifying bid (e.g., a bid that is better than the default), then the standard carrier can be used at act 714. However, insurance coverage can be implemented such that there is no standard carrier used and a best bid can be used in coverage selection. At event 716, there can be selecting of a bid to use for vehicle or operator coverage—more than one bid can be selected to cover the user and selection can be performed automatically (e.g., through use of artificial intelligence techniques). Messages can be transferred to at least one winning as well as other companies at act 718. The interface can be configured based upon the winning bid (e.g., based upon how a winner instructs, with information consistent with the bid such as standards and rates, etc.) at action 720 and the interface can be presented to an operator of a vehicle.

Figure 8:
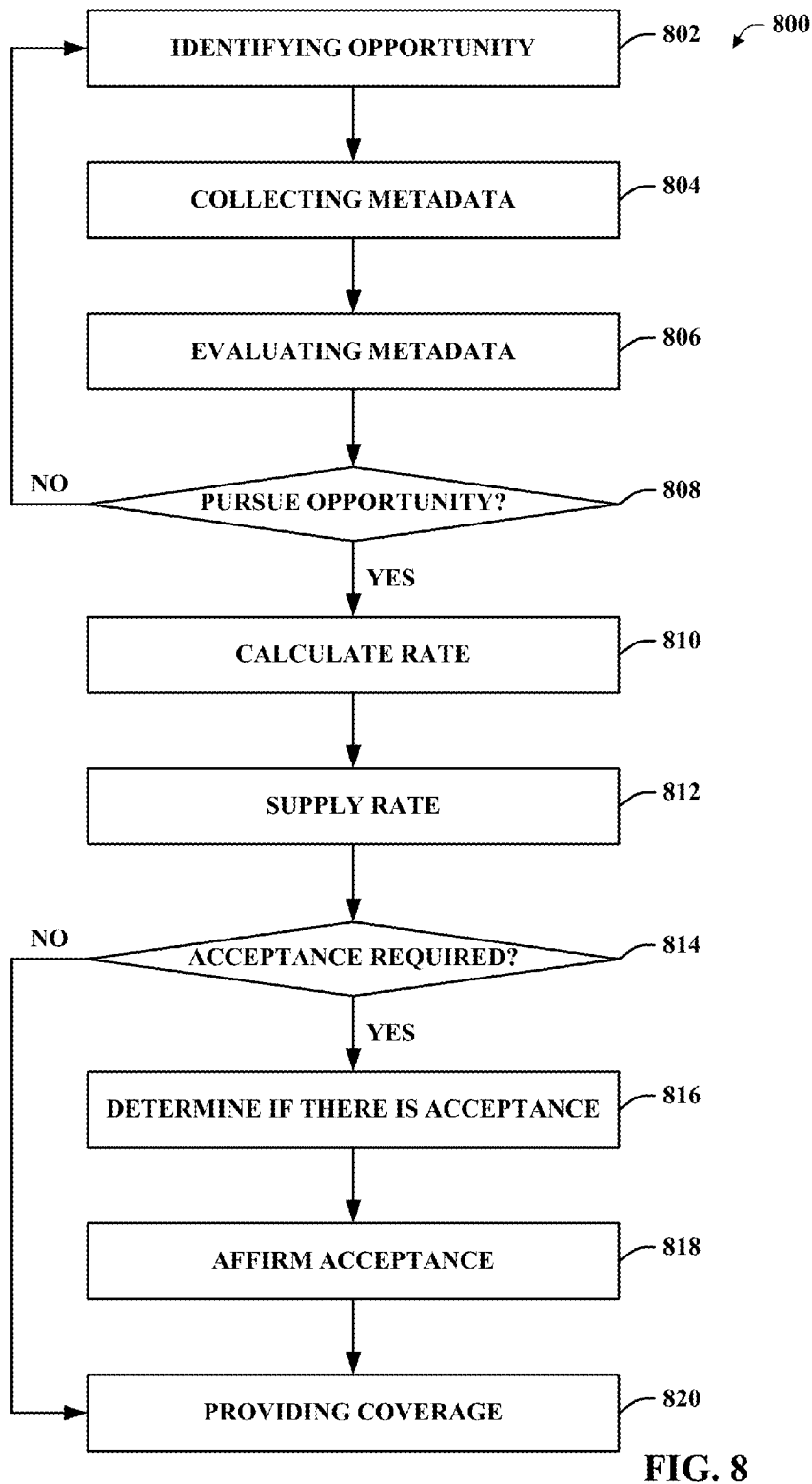
FIG. 8 illustrates a representative methodology for preparing a bid for real-time insurance in accordance with an aspect of the subject specification.

Referring to FIG. 8, an example methodology 800 is disclosed for supplying a rate for insurance coverage. While insurance calculation can be performed at a vehicle, a company can determine a rate or rate structure available to a vehicle or operator. The insurance company can employ software to monitor vehicle operation and identify an opportunity to provide insurance at action 802.

At event 804, there can be collecting the contextual information, driver history metadata, and real-time driving information (e.g., the collection is evaluated and used in calculating the real-time rate). There can also be evaluating contextual information, driver history information, and real-time driving information that relates to operation of a vehicle at act 806 (e.g., at least a portion of the information is retained upon physical storage). A check 808 can be used to determine if the opportunity should be pursued (e.g., based upon a result of the evaluation). If it is determined that the opportunity should not be pursued, then the methodology can return to action 802 to identify another opportunity.

At action 810, there can be calculating a real-time insurance rate based upon a result of the evaluation (e.g., the determined rate is presented upon a display viewable to an operator or passenger of a vehicle). The real-time rate can be supplied at event 812, such as through transferring the rate to a requesting vehicle. The rate can include a rate structure for what to charge an operator based on different situations as well as be a model supplied that can be used locally (e.g., at the vehicle) to determine a real-time rate.

A check 814 can be performed to determine if the rate is such that an entity accepts the rate for the rate to be in effect. For example, the insurance company can globally provide for a vehicle (e.g., through a time-based contract) and the rate can be automatically implemented since the company provides the global rate—thus the rate is specific to a situation and the identified opportunity is an opportunity to provide a different and/or more accurate rate.

If there should be acceptance before providing coverage (e.g., based upon a result of the check 814), then a determination can be made on if there is acceptance at event 816. For example, event 816 can include waiting a time for a response, obtaining the response (e.g., to the bid) and evaluating the response to determine if there is acceptance. Acceptance can be affirmed at act 818 and coverage can be provided (e.g., if acceptance is not required, if acceptance is affirmed, etc.) at action 820. In an alternative embodiment, if acceptance is not received (e.g., there is a rejection, a timer expires, etc.), then the methodology 800 can return to action 802 to identifying another opportunity.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
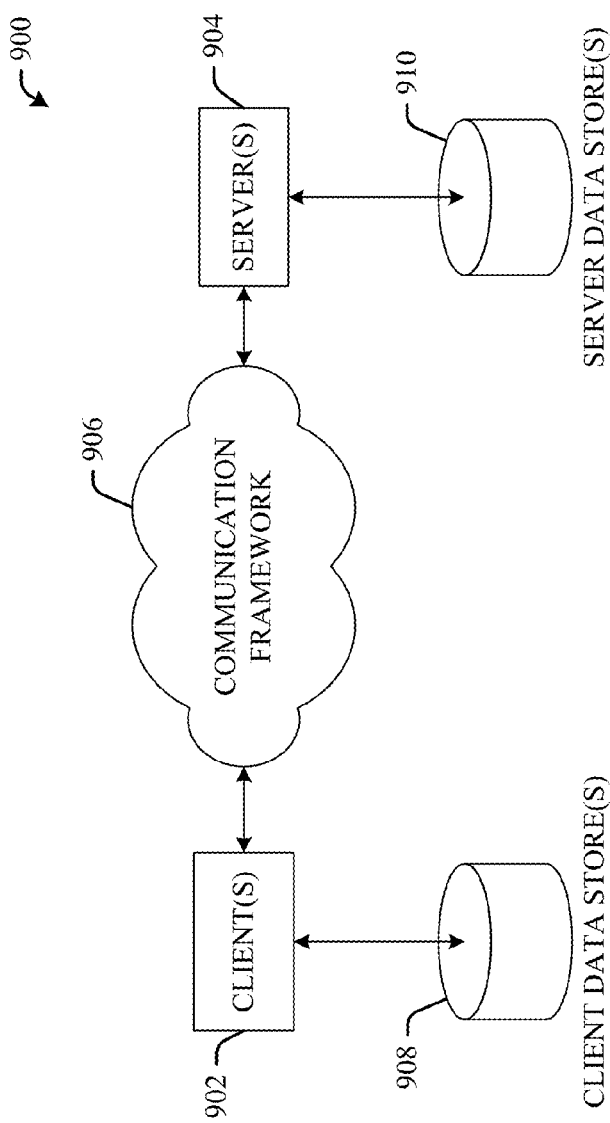
FIG. 9 illustrates an example of a schematic block diagram of a computing environment in accordance with an aspect of the subject specification.
Figure 10:
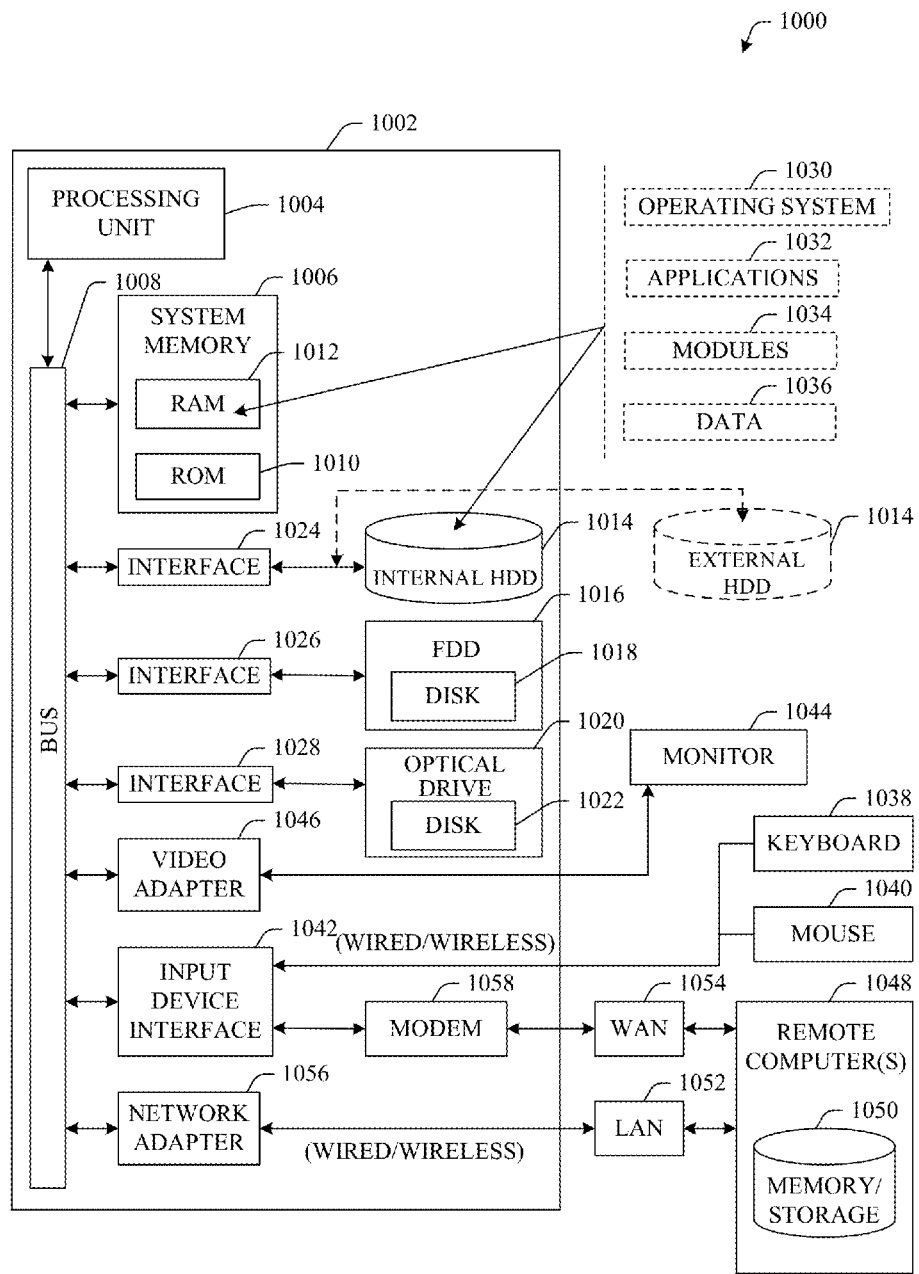
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

In accordance with at least one aspect, the disclose innovation relates to consolidating, analyzing, and presenting information that results from the acquisition and handling of data for an insured unit of risk. Thus, there can be presenting a qualitative representation of summary data that can be derived from data that is being gathered primarily to calculate the cost of insurance in real time. Using a color scale (e.g., from red to green across the hue spectrum) to summarize real-time data on road, vehicle and traffic conditions, driving technique, and location, there can be a visual assessment of safety continuously available to a driver or passenger.

Multivariate instrument optimization could be used to combine numeric inputs to create a rapidly perceived display. A regression-based approach, which can be implemented in accordance with at least one aspect disclosed herein, combines the inputs, and can produce an output that summarizes them along one or a few important dimensions; that output can be converted to a hue.

The hue scale could vary from green (e.g., used when conditions are especially safe) through yellows and oranges to red (e.g., when they are especially dangerous). The hue scale could also turn blue when the car is off the network or the data coming from the vehicle cannot be evaluated at a reasonable standard of accuracy.

In one illustrative embodiment, the device uses three light-emitting diodes (LEDs) (e.g., red, green and blue) or similar devices mounted on a printed circuit board (PCB) and driven by logic on that board that interprets a digital output coming from the vender's under dash unit. An on-board circuit could, such as based on that value, adjust the LEDs so that together they produce the appropriate color to represent current conditions. The PCB could also be enclosed in an attractive disk-shaped acrylic package, suitable for placement on the dashboard of the vehicle. The package could be embossed with the name and logo of the insurance carrier and connect to the vendor's under-dash unit with a simple chord.

At least one aspect disclosed herein can allow the automobile insurance industry to take advantage of information about a vehicle's location and conditions of operation to assess risk dynamically and thereby adjust insurance rates. Aspects disclosed can function in conjunction with devices that collect and integrate information as black boxes (e.g., that operate either outside of the user's visual awareness or that provide feedback through web pages or GPS (global positioning system) displays).

Use of a black box along can be limited such that the box renders the service invisible to the insurance consumer most of the time. A limitation of a complex display could be that it adds a set of controls to those the driver must already contend with, thereby relegating their use to times when the operator is not actually driving or increasing the prospects of driver distraction.

The disclosed innovation contemplates a new way of summarizing the information and presenting it in the form of an attractive and simple device that would emit a soft glow reflecting the safety (or cost, environmental impact, or similar) of the current driving situation. Therefore, there can be benefit of making the insurance carrier visible to the driver and passengers of the vehicle.

Thus, there can be a method of extending an insurer's visibility to its customers while providing the customers with valuable feedback on how safely they are driving a vehicle includes a dashboard mounted display and an approach to summarizing multiple dimension data using a continuous color scale.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system for rendering insurance information, comprising:
   a special purpose processor specifically configured to execute the following computer executable components stored on a storage medium:

a collections component that identifies an opportunity to provide a real-time insurance rate, and collects contextual information, driver history metadata, and real-time vehicle operation information, wherein the collected information is evaluated and used to calculate the real-time insurance rate, and to supply the real-time insurance rate;

an analysis component that receives and evaluates the real-time vehicle operation information, road condition data, weather data, traffic data, and current vehicle operation by the user;

an artificial intelligence component that learns from the real-time vehicle operation information, road condition data, weather data, and traffic data, the current vehicle operation by the user, and facilitates making determinations or inferences regarding risk assessment relating to real-time operation of the vehicle, appropriate insurance rates and projected insurance rates; and a rendering component that employs a regression-based method that reduces complex multi-dimensional data available through an insurer network to a single or small number of values, the single or small number of values represented as color(s) produced by LEDs, and represents how safely the vehicle is being driven, and renders on a display a real-time insurance rate that is based at least in part on a result of the evaluation by the analysis component, wherein the display of the vehicle is physically integrated upon a dashboard of the vehicle, is a heads-up display, is located within the vehicle or a combination thereof.

2. The system of claim 1, wherein the collection component obtains metadata that pertains to current vehicle operation by the user.

3. The system of claim 2, further comprising a search component that locates an information source, wherein the information source provides at least a portion of the insurance rate information or the metadata that pertains to current vehicle operation by the user obtained by the collection component.

4. The system of claim 1, wherein the analysis component employs at least one regression-based technique to perform at least part of the evaluation.

5. The system of claim 1, wherein the rendering component renders, in addition to the real-time insurance rate, driving feedback information, an indicator showing at least one standard to achieve an insurance rate modification, a status of at least one standard to achieve an insurance rate modification, or a combination thereof.

6. The system of claim 1, further comprising:
an assessment component that appraises at least one contextual factor related to current vehicle operation by the user; and
a calculation component that determines the insurance rate that is rendered based upon an outcome of the appraisal and the evaluation.

7. The system of claim 6, wherein the assessment component functions as part of a cellular telephone, radio frequency identifier, keyfob, or a combination thereof.

8. The system of claim 6, wherein the at least one contextual factor includes a traffic level, a number of passengers in the vehicle, a status of a operator related to engagement of a cellular telephone communication, time of day, weather, history of a neighborhood, intended destination, real-time vehicle condition, or a combination thereof.

9. The system of claim 1, further comprising a personalization component that enables modification of the display, wherein the modification includes information displayed, location of the displayed information, where the interface displays, or a combination thereof.

10. A method for real-time insurance rate calculation, comprising:
using a special purpose processor specifically to execute computer executable instructions stored on a computer readable medium to perform the following acts:
using a collections component to identify an opportunity to provide insurance, and collect contextual information, driver history metadata, and real-time vehicle operation information, wherein the collected information is evaluated and used to calculate the real-time insurance rate, and to supply the real-time insurance rate;
using an analysis component to receive and evaluate the real-time vehicle operation data, road condition data, weather data, traffic data, and current vehicle operation by the user;
using an artificial intelligence component to learn from the real-time vehicle operation data, road condition data, weather data, traffic data, and the current vehicle operation by the user, and to facilitate making determinations or inferences regarding risk assessment relating to real-time operation of the vehicle, appropriate insurance rates and projected insurance rates; and
using a rendering component to employ a regression-based method that reduces complex multi-dimensional data available through an insurer network to a single or small number of values, the single or small number of values represented as color(s) produced by LEDs and represents how safely the vehicle is being driven, and renders on a display a real-time insurance rate that is based at least in part on a result of the evaluation by the analysis component, wherein the display of the vehicle is physically integrated upon a dashboard of the vehicle, is a heads-up display, is located within the vehicle, or a combination thereof.

11. The method of claim 10, further comprising presenting a determined rate on the display.

12. The method of claim 11, further comprising selecting an advertisement to display along with the determined rate, wherein the selected advertisement is displayed with the determined rate.

13. The method of claim 11, wherein the display is an interactive interface, upon which an operator can engage the interface and be presented information on rationale for the rate, how the operator can improve the rate, how the operator compares against other operators, or a combination thereof.

14. The method of claim 10, further comprising:
determining feedback to suggest future driving actions for the operator to perform to lower the insurance rate; and
presenting the feedback.

\* \* \* \* \*